United States Patent
Kim et al.

(10) Patent No.: US 9,825,543 B1
(45) Date of Patent: Nov. 21, 2017

(54) POWER CONVERTER AND CONTROL METHOD FOR FAULT EVENT OCCURRENCE

(71) Applicant: SEMICONDUCTOR COMPONENTS INDUSTRIES, LLC, Phoenix, AZ (US)

(72) Inventors: Eui-Soo Kim, New Taipei (TW); Jian-Ming Fu, Taichung (TW); Tse-Jen Tseng, Taichung (TW); Chou-Sheng Wang, Keelung (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/229,084

(22) Filed: Aug. 4, 2016

(51) Int. Cl.
  *H02H 7/122* (2006.01)
  *H02M 3/335* (2006.01)
  *H02M 1/32* (2007.01)

(52) U.S. Cl.
  CPC ......... *H02M 3/33523* (2013.01); *H02M 1/32* (2013.01)

(58) Field of Classification Search
  CPC ............. H02M 3/335; H02M 3/33507; H02M 3/33515; H02M 3/33523; H02M 3/33538; H02M 3/33546; H02M 3/33553; H02M 1/32

USPC .......... 363/21.04, 21.05, 21.06, 21.07, 21.1, 363/21.11, 21.12, 21.13, 21.14, 21.15, 363/21.18, 56.09, 56.1, 56.11
  See application file for complete search history.

(56) References Cited

U.S. PATENT DOCUMENTS

| | | | | |
|---|---|---|---|---|
| 5,862,044 A | * | 1/1999 | Shioya | H02M 3/33523 363/56.11 |
| 6,088,244 A | * | 7/2000 | Shioya | H02M 1/32 363/21.07 |
| 2016/0036340 A1 | * | 2/2016 | Kikuchi | H02M 1/32 363/21.14 |
| 2016/0072399 A1 | * | 3/2016 | Kikuchi | H02M 3/33592 363/21.14 |

* cited by examiner

*Primary Examiner* — Alex Torres-Rivera
(74) *Attorney, Agent, or Firm* — Robert F. Hightower

(57) ABSTRACT

A power converter and a control method therefor are provided. The power converter includes a transformer, a primary-side control circuit and a secondary-side control circuit. A primary side of the transformer receives an input voltage, and a secondary side of the transformer generates an output voltage. The primary-side control circuit controls a current switch of a primary winding and switching thereof. The secondary-side control circuit is disposed at the secondary side of the transformer. The secondary-side control circuit comprises a latch circuit. The latch circuit clamps a feedback signal and maintains a clamped status of the feedback signal when an fault event occurs. The primary-side control circuit stops switching the current switch of the primary winding when the feedback signal is clamped, and the latch releases the feedback signal when the output voltage is lower than a default latch voltage value.

10 Claims, 6 Drawing Sheets

POWER CONVERTER AND CONTROL METHOD FOR FAULT EVENT OCCURRENCE

BACKGROUND

Field of the Invention

The invention is directed to a power converting technique and more particularly, to a power converter without a charge pump circuit disposed in a secondary-side control circuit and a control method therefor.

Description of Related Art

Power conversion apparatuses are mainly used in converting high-level and unregulated input voltages into an output voltage with low levels and good stability that can be suitable for various types of electronic devices. In this way, the power conversion apparatus is widely applied to electronic devices, such as computers, office automation equipment, industrial control equipment and communication instruments.

A common flyback power converter usually is disposed a primary-side control circuit and a secondary-side control circuit at a primary winding and a secondary winding of a transformer respectively. The primary-side control circuit mainly controls a current flowing through the primary winding to perform power conversion by using a pulse-width modulation (PWM) signal and a current switch controlled by the PWM signal. The secondary-side control circuit is used to detect the situation of an output voltage. When value of the output voltage becomes too high, for example, at light load condition, the secondary-side control circuit will notice the primary-side control circuit to stop switching the current switch of the primary winding to pull down the output voltage. The primary-side control circuit will resume switching the current switch of the primary winding again when the output voltage becomes insufficient. The operation as described above is to regulate the output voltage at an approximately constant value. As the load condition becomes even lighter, a burst mode regulation will be applied to obtain a higher efficiency.

However, the operating voltage of the secondary-side control circuit is powered by the output voltage of the power converter. Because of that, the secondary-side control circuit may not work because of the lowered operating voltage when the output voltage is pulled down by the primary-side control circuit. In the past, a charge pump circuit is disposed at the secondary-side control circuit of the power converter. The charge pump circuit forces to raise the operating voltage of the secondary-side control circuit when the output voltage is pulled down, so as to maintain the operation of secondary-side control circuit normally. Yet, the charge pump circuit may occupy significant circuit space and increase the manufacturing cost of the flyback power converter.

SUMMARY

The invention provides a power converter and a control method therefor. A latch circuit of a secondary-side control circuit in the power converter is designed for controlling a feedback signal properly when a output voltage has been pulled down without disposing a charge pump circuit for increasing an operating voltage of the secondary-side control circuit.

In an embodiment of the invention, a power converter is disclosed in the invention. The power converter includes a transformer, a primary-side control circuit and a secondary-side control circuit. The primary-side control circuit is disposed at the primary side of the transformer and controls a current switch of a primary winding and switching thereof. The secondary-side control circuit is disposed at the secondary side of the transformer. The secondary-side control circuit comprises a latch circuit. The latch circuit clamps a feedback signal and maintains a clamped status of the feedback signal when an fault event occurs. The primary-side control circuit stops switching the current switch of the primary winding when the feedback signal is clamped, and the latch releases the feedback signal when output voltage is lower than a default latch voltage value.

In an embodiment of the invention, a control method of a power converter is disclosed in the invention, in which the power converter includes a transformer, a primary-side control circuit and a secondary-side control circuit. The control method includes following steps. Whether a fault event occurs or not is detected. A feedback signal is clamped and a clamped status of the feedback signal is maintained by a latch circuit of the secondary-side control circuit when the fault event occurs. Switching a current switch of a primary winding is stopped by the primary-side control circuit when the feedback signal is clamped. And, the feedback signal is released by the latch circuit when output voltage is lower than a default latch voltage value.

As to foregoing descriptions, the power converter and the control method therefor as described in embodiments of the invention can clamp the feedback signal and maintain the clamped status of the feedback signal by the latch circuit located in the secondary-side control circuit when a fault event occurs. And, when the output voltage of the power converter has been pull low, the latch circuit can release the feedback signal to make the feedback signal leave the clamped status. Such that, the feedback signal is still controlled properly when an output voltage has been pulled down without disposing a charge pump circuit for increasing the operating voltage of the secondary-side control circuit.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
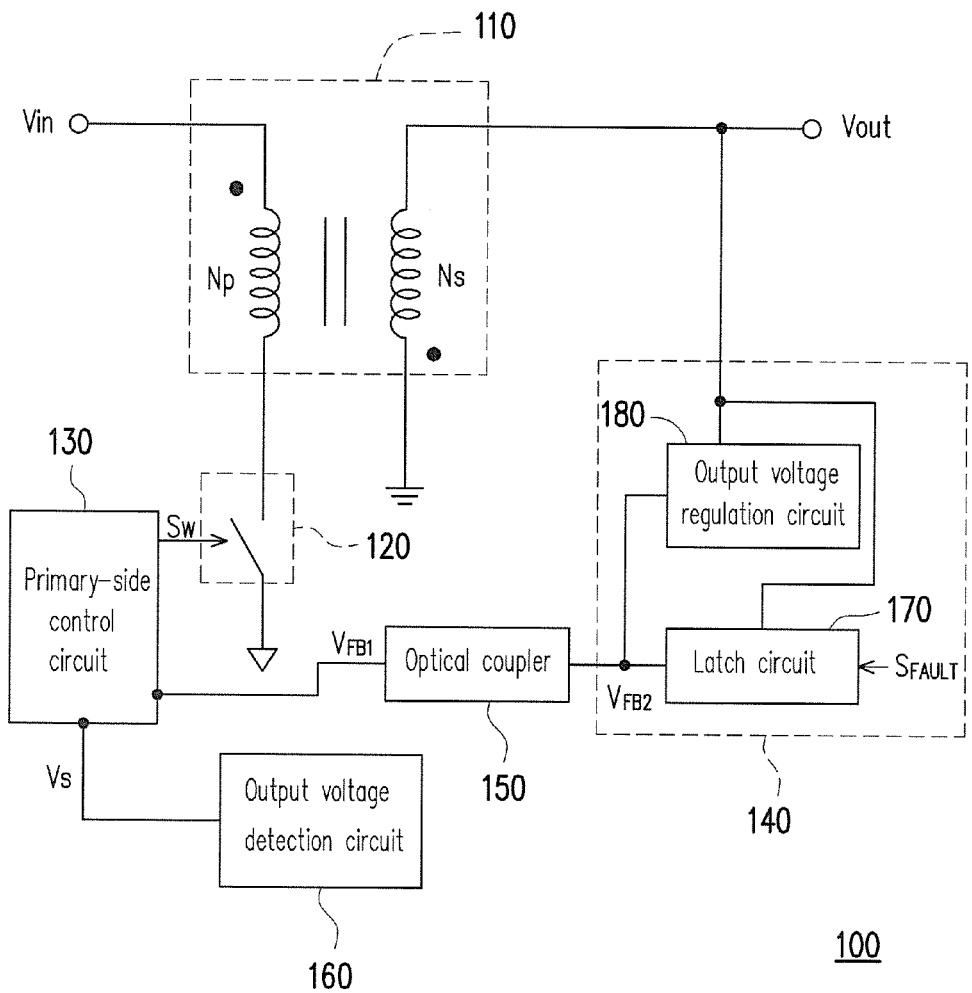
FIG. 1 is a schematic block diagram illustrating a power converter according to an embodiment of the invention.

FIG. 1 is a schematic block diagram illustrating a power converter 100 according to an embodiment of the invention. Referring to FIG. 1, the power converter 100 mainly includes a transformer 110, a current switch unit 120 of a primary winding Np, a primary-side control circuit 130 and a secondary-side control circuit 140. The power converter 100 further includes an optical coupler 150 and an output voltage detection circuit 160 located at the primary side of the transformer 110. The sensing signal Vs generated by the output voltage detection circuit 160 is correlated to the output voltage Vout. A common-polarity terminal of the primary winding Np of the transformer 110 receives an input voltage Vin, and a secondary winding Ns of the transformer 110 generates an output voltage Vout. The primary-side control circuit 130 disposed at the primary side of the transformer 110 controls the current switch 120 of the primary winding Np by the switching signal Sw for switching the current switch 120.

The secondary-side control circuit 140 is disposed at the secondary side of the transformer 110. The secondary-side control circuit 140 mainly detects whether value of the output voltage Vout is normal, and determines whether a fault event occurs. The secondary-side control circuit 140 of the invention embodiment may include a latch circuit 170 and an output voltage regulation circuit 180. The function of the output voltage regulation circuit 180 is to control the current flowing through a light emitting diode (LED) of the optical coupler 150. Whenever the value of the output voltage Vout is too large, the primary-side control circuit 130 will stop switching the current switch 120 of the primary winding Np, such that the output voltage Vout will be decreased (regulated) in a safety range. In the embodiment of the invention, the primary-side control circuit 130 stops switching the current switch 120 of the primary winding Np is referred that the switching of the current switch 120 is completely stopped, or the switching of the current switch 120 is controlled by the pulse-width modulation (PWM) signal with smaller pulse width in a burst mode.

Figure 2:
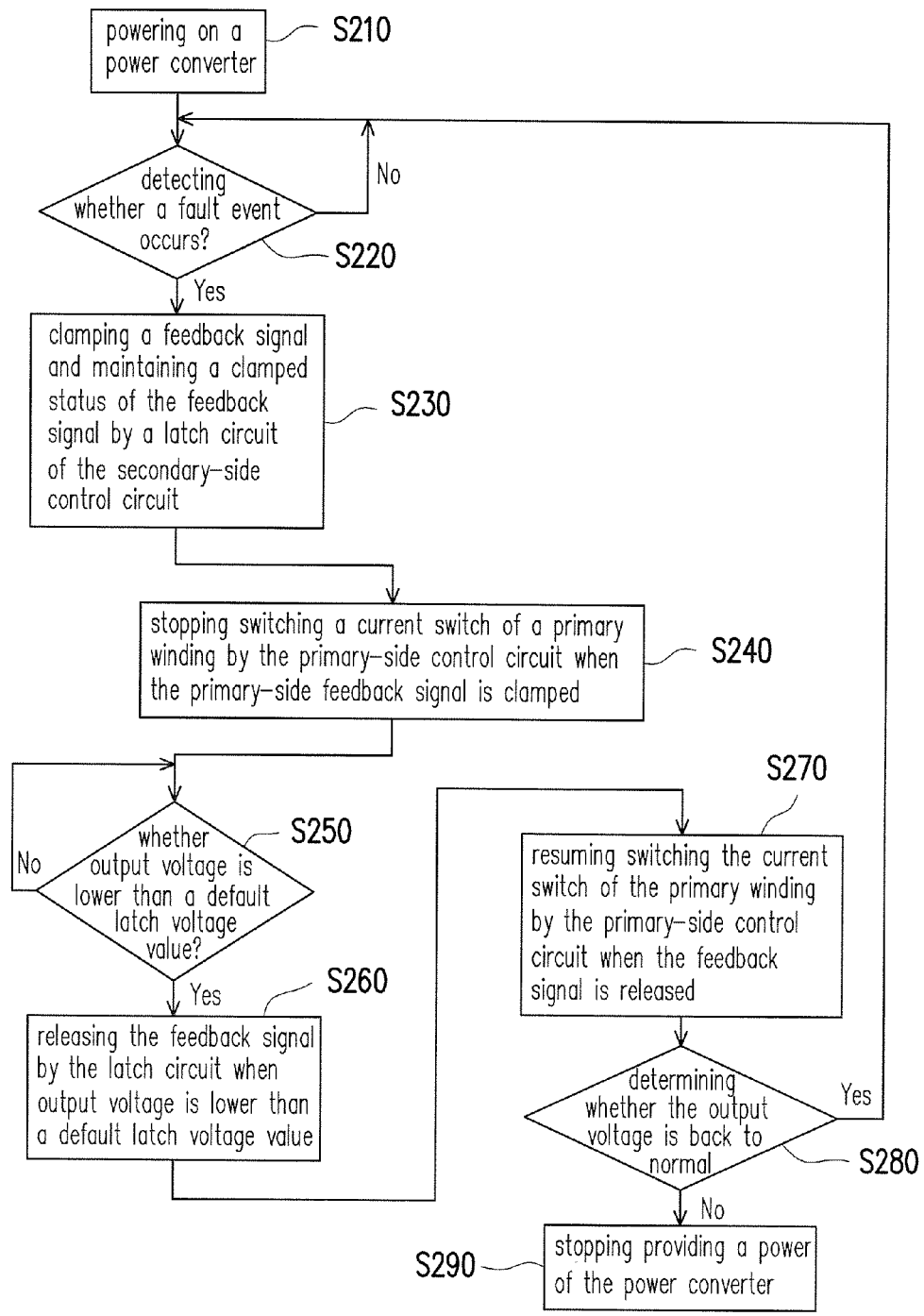
FIG. 2 is a flowchart illustrating a control method for a power converter according to an embodiment of the invention.

FIG. 2 is a flowchart illustrating a control method for the power converter 100 according to an embodiment of the invention. The control method is implemented by the power converter 100 of FIG. 1. Referring to FIG. 1 and FIG. 2 simultaneously, in step S210, the power converter 100 is powered on. The primary-side control circuit 130 of the embodiment may control the power of the power converter 100. In step S220, the latch circuit 170 receives a fault signal $S_{FAULT}$, and detects whether a fault event occurs by sensing the fault signal $S_{FAULT}$. In other words, when the fault event occurs, the fault signal $S_{FAULT}$ is enabled. The 'fault event' may be referred as a fault information provided by the other circuits located at the secondary side of the transformer 110. The fault signal $S_{FAULT}$ will indicate the occurrence of a fault event and the power converter 100 may need to be shut down to protect each circuit in the power converter 100 for avoiding damaged. The persons skilled in the art may adjust the situations of the fault event and the embodiment of the invention is not limited thereof.

When the fault event occurs, entering step S230 from step S220, the latch circuit 170 clamps the feedback signal $V_{FB2}$, for example, to a ground level, and maintains the clamped status thereof. Via the optical coupler 150 of the embodiment in FIG. 1, the primary-side feedback signal $V_{FB1}$ at the primary side of the transformer 110 will be responsive to the feedback signal $V_{FB2}$ located at the secondary side of the transformer 110. That is, once the feedback signal $V_{FB2}$ is clamped, the primary-side feedback signal $V_{FB1}$ will be clamped responsively. In step S240, when the primary-side feedback signal $V_{FB1}$ is clamped, the primary-side control circuit 130 stops switching the current switch 120 of the primary winding Np, and the output voltage Vout is reduced gradually because of parasitic capacitances.

Because the fault signal $S_{FAULT}$ is enabled continuously with the existence of fault event, the feedback signal $V_{FB2}$ may be in the clamped status permanently. In the event of the feedback signal $V_{FB2}$ and the primary-side feedback signal $V_{FB1}$ are both clamped permanently, the output voltage Vout will be reduced continuously till zero. This will cause the insufficient operating voltage of the secondary-side control circuit 140 because its operating voltage is supplied by the output voltage Vout. To avoid this situation, the feedback signal $V_{FB2}$ and the primary-side feedback signal $V_{FB1}$ need to be released from the clamped status in case the fault event disappears. Such that, the power converter 100 can determine whether the output voltage Vout is back to normal, or determine to shut down itself.

In step S250, it is determined whether the output voltage Vout is lower than the default latch voltage value. It is noticed that, in step S250, the latch circuit 170 does not actively detect or determine whether the value of the output voltage Vout. On the contrary, the latch circuit 170 of the invention embodiment releases the feedback signal $V_{FB2}$ and makes the feedback signal $V_{FB2}$ leave the clamped status in a passive way when the output voltage Vout is reduced to be lower than the default latch voltage value of the latch circuit 170 (step S260). The latch circuit 170 can be implemented by circuits consist of resistors and transistors. The latch circuit 170 still controls the feedback signal $V_{FB2}$ properly when the output voltage Vout has been pulled low, such that the secondary-side control circuit 140 does not need to dispose a charge pump circuit to maintain its required operating voltage.

When the feedback signal $V_{FB2}$ is released, entering step S270 from step S260, the primary-side control circuit 130 resumes the switching for the current switch 120 of the primary winding Np by the primary-side feedback signal $V_{FB1}$. And, in step S280, the primary-side control circuit 130 determines whether the output voltage Vout is back to normal by the output voltage detection circuit 160 after the switching for the current switch 120 is resumed and the current switch 120 is normally switched. When the output voltage Vout is already back to normal, back to the step S220 for detecting whether the fault event occurs again. On the other hand, when the output voltage Vout is not back to normal, entering step S290 from step S280, the primary-side control circuit 130 stops providing the power of the power converter 100 to shut down the power converter 100.

Figure 3:
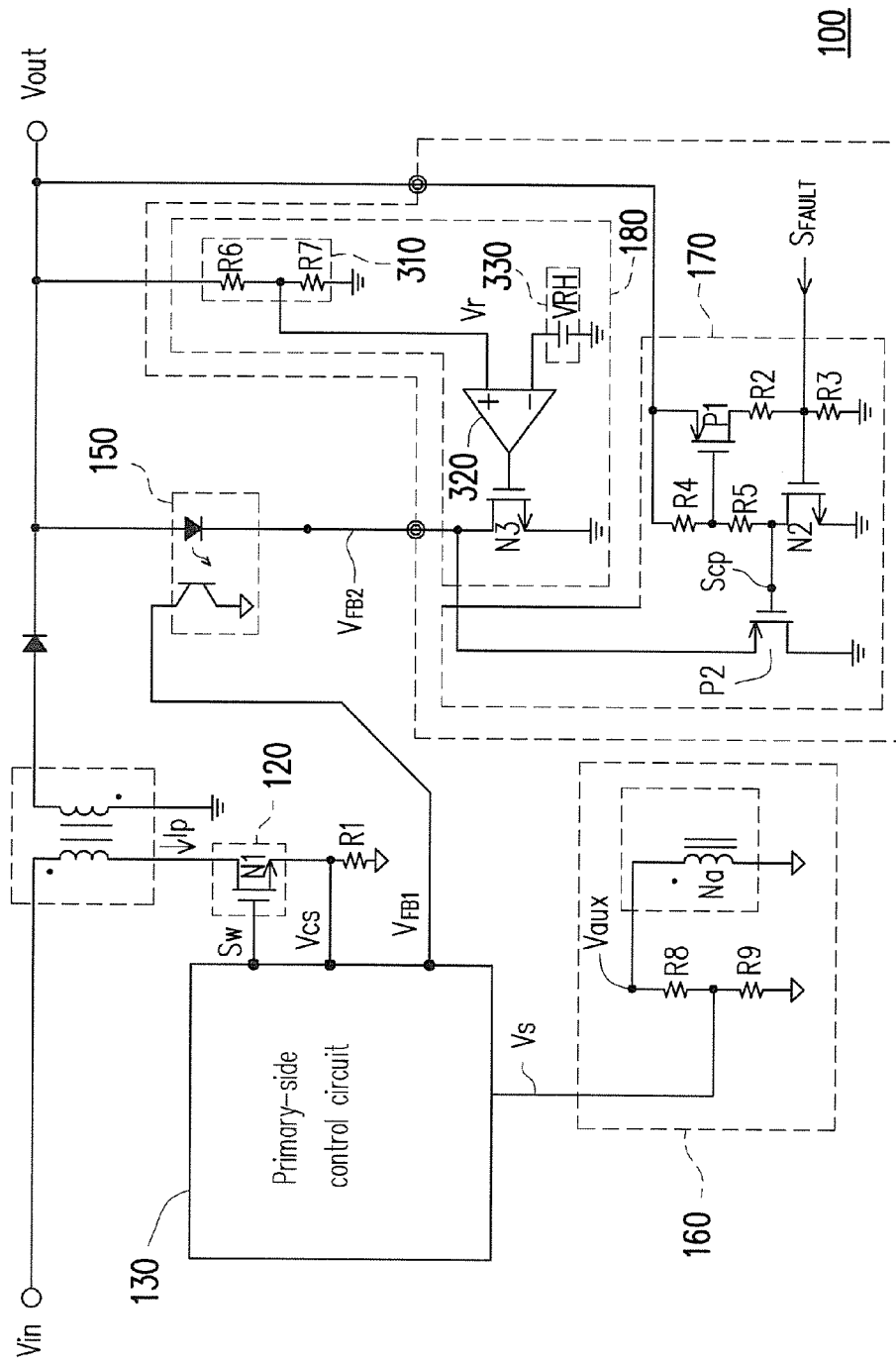
FIG. 3 is a schematic circuit diagram illustrating a power converter according to an embodiment of the invention.

FIG. 3 is a schematic circuit diagram illustrating the power converter 100 according to an embodiment of the invention. FIG. 3 depicts circuit structures of the current switch 120, the optical coupler 150, the latch circuit 170 and the output voltage regulation circuit 180 of the secondary-side control circuit 140 and the output voltage detection circuit 160 respectively. The current switch 120 may be implemented by an N-type MOSFET. A control node of the transistor N1 receives the switching signal Sw, a first node of the transistor N1 is coupled to an opposite-polarity terminal of the primary winding Np of the transformer 110, and a second node of the transistor N1 is connected to ground node through a resistor R1. The second node of the transistor N1 has a detecting voltage Vcs.

The latch circuit 170 of the embodiment is consist of P-type transistors P1 and P2, an N-type transistor N2, and a plurality of resistors R2-R5. The first node of the transistor P1 is received the output voltage Vout and is coupled to one node of the resistor R4, and the second node of the transistor P1 is coupled to one node of the resistor R2. The control node of the transistor P1 is coupled to another node of the resistor R4 and one node of the resistor R5. An another node of the resistor R2 is coupled to the control node of the transistor N2 and one node of the resistor R3. A first node of the transistor N2 is coupled to another node of the resistor R5 and the control node of the transistor P2, and the first node of the transistor N2 is coupled to the ground node. The first node of the transistor P2 receives the feedback signal $V_{FB2}$, and the second node of the transistor P2 is coupled to the ground node. The control node of the transistor P2 receives the transistor control signal Scp.

Based on the circuit structure of the latch circuit 170, when the fault signal $S_{FAULT}$ is not enabled (i.e., logic 0) and the power converter 100 is operated normally, the feedback signal $V_{FB2}$ is approximately equal to the output voltage Vout, for example, a forward voltage of the LED of optical coupler 150. On the contrary, when the fault signal $S_{FAULT}$ is enabled (i.e., logic 1) and the output voltage Vout is normal, the transistors N2, P1 and P2 are turned on, such that the feedback signal $V_{FB2}$ will be pulled down to a ground level. After the feedback signal $V_{FB2}$ is clamped, the primary-side feedback signal $V_{FB1}$ will be clamped responsively. This will stop the switching of the current switch 120 of the primary winding Np, the output voltage Vout will start to decrease. Furthermore, when the fault signal $S_{FAULT}$ is enabled (i.e., logic 1) and the output voltage Vout is lower than the default latch voltage value, the voltage at the control node of the transistor N2 will become too low to continue turning on the transistor N2. Accordingly, the transistors P1 and P2 will be turned off in response to the turn-off of the transistor N2. This will release the feedback signal $V_{FB2}$ and leave the clamped status of the feedback signal $V_{FB2}$.

The output voltage regulation circuit 180 is mainly composed of a divider circuit 310 with resistors R6 and R7, an error amplifier 320, a reference voltage 330 and a transistor N3. The divider circuit 310 generates a divided voltage Vr according to the output voltage Vout by using the resistor R6 and R7. The error amplifier 320 amplifies the difference between the divided voltage Vr and the reference voltage value VRH and varies the current flowing through the transistor N3 which is also the current flowing through the LED of the optical coupler 150. The current flowing through the transistor N3 controls the primary-side feedback signal $V_{FB1}$ to switch the current switch 120 adaptively according to the difference between the divided voltage Vr and the reference voltage value VRH. In this manner, the output voltage Vout can be regulated.

Figure 6:
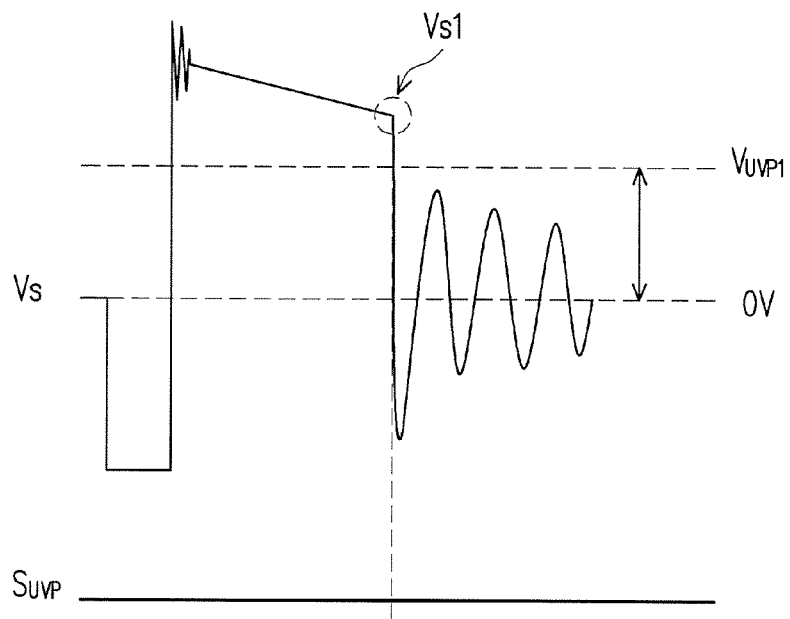
FIG. 6 is a signal timing chart of the sensing signal in block 510 of FIG. 5 and the corresponding protecting signal.
Figure 7:
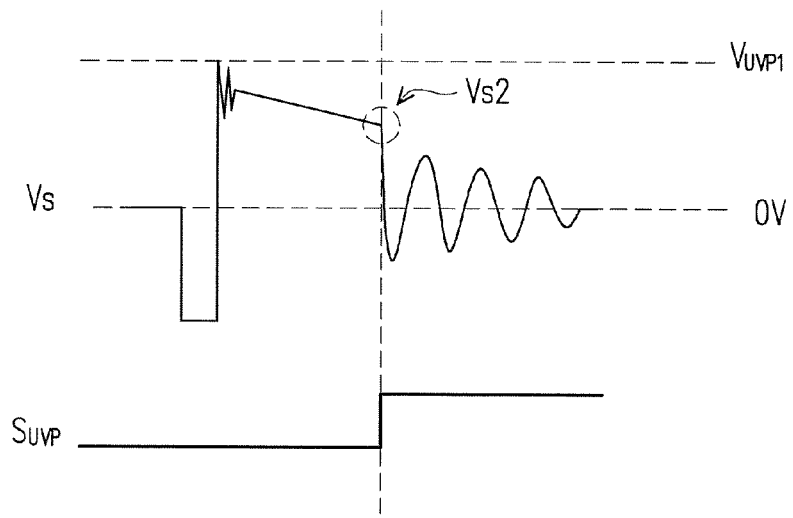
FIG. 7 is a signal timing chart of the sensing signal in block 520 of FIG. 5 and the corresponding protecting signal.

The output voltage detection circuit 160 is disposed at the primary side of the transformer 110. The output voltage detection circuit 160 includes an auxiliary winding Na, resistors R8 and R9. The auxiliary winding Na senses the secondary winding Ns to generate an auxiliary voltage Vaux. The sensing signal Vs is generated by dividing the auxiliary voltage Vaux with the resistors R8 and R9. Referring to FIG. 6 and FIG. 7, the voltage levels of the sensing signal Vs denoted as Vs1 and Vs2 are represented as Vsx here. Therefore, the relationship among the auxiliary voltage Vaux, the output voltage Vout and the voltage level Vsx of the sensing signal Vs will be presented as equation (1):

$$V_{sx} = V_{aux} \times \frac{R9}{R8 + R9} = V_{out} \times \frac{NNa}{NNs} \times \frac{R9}{R8 + R9} \qquad (1)$$

Wherein the 'NNa' is referred to as a turn number of the winding auxiliary winding, the 'NNs' is referred to as a turn number of the secondary winding Ns. It can be seen that the voltage level Vsx of the sensing signal Vs is correlated to the output voltage Vout in the above equation.

Figure 4:
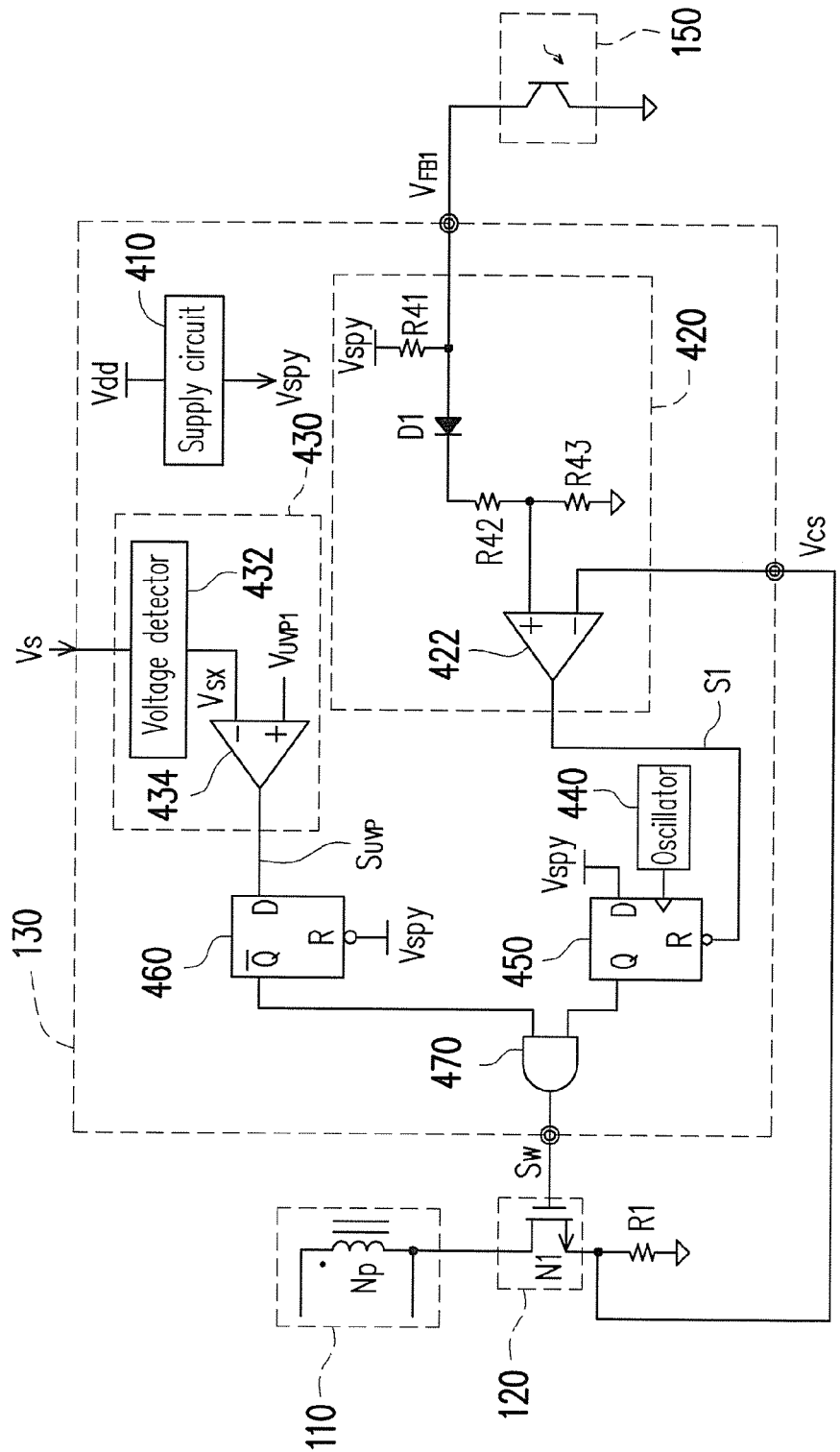
FIG. 4 is one of circuit structure diagrams illustrating a primary-side control circuit of FIG. 3.

FIG. 4 is an exemplary circuit structure diagrams illustrating the primary-side control circuit 130 of FIG. 3. The primary-side control circuit 130 includes a supply circuit 410, a feedback signal determination circuit 420, a sensing signal determination circuit 430, an oscillator 440, D-type flip-flops 450 and 460, and an AND gate 470. The supply circuit 410 generates an internal supply voltage Vspy within the primary-side control circuit 130 according to the operating voltage Vdd of the primary-side control circuit 130.

The feedback signal determination circuit 420 includes resistors R41-R43, and a diode D1 and a comparator 422. The primary-side feedback signal $V_{FB1}$ is limited by the resistor R41 and the supply voltage Vspy, such that the primary-side feedback signal $V_{FB1}$ will not be larger than the supply voltage Vspy. The comparator 422 compares a attenuated voltage at a non-inverting terminal with the detecting voltage Vcs at an inverting terminal to generate a comparing result S1, wherein the attenuated voltage is derived from the primary-side feedback signal $V_{FB1}$ via the resistors R42, R43 and the diode D1. The attenuated voltage is compared with the detecting voltage Vcs to adjust the duty period of the switching signal Sw. The clock node of the flip-flop 450 receives a clock signal generated from the oscillator 440, the reset node of the flip-flop 450 receives the comparing result S1 of the comparator 422, and the data node of the flip-flop 450 receives the supply voltage Vspy. The output node of the flip-flop 460 is coupled to a first input node of the AND gate 470. Therefore, when the primary-side feedback signal $V_{FB1}$ is clamped, the rest node of the flip-flop 450 will be continuously at logic 0, and the switching signal Sw generated by the output node of the AND gate 470 will be disabled. Thus, the primary-side control circuit 130 stops switching the current switch 120 at this moment.

The sensing signal determination circuit 430 includes a voltage detector 432 and a comparator 434. The voltage detector 432 detects the sensing signal Vs and transmits the voltage level Vsx of the sensing signal Vs to an inverting terminal of the comparator 434. The non-inverting terminal of the comparator 434 receives a protect voltage value $V_{UVP1}$. The comparator 434 compares the voltages at inverting terminal and the non-inverting terminal thereof to generate a protecting signal $S_{UVP}$. The data node of the flip-flop 460 receives the protecting signal $S_{UVP}$, and the reset node of the flip-flop 460 receives the value of the inverting supply voltage Vspy via an inverter. The output node of the flip-flop 460 is coupled to a second input node of the AND gate 470. Thus, when the voltage level Vsx of the sensing signal Vs is larger than the protect voltage value $V_{UVP1}$, it is referred that the output voltage Vout is back to normal, and the power converter 100 can operates normally. On the other hand, when the voltage level Vsx of the sensing signal Vs is smaller or not larger than the protect voltage value $V_{UVP1}$, it is referred that the output voltage Vout is lower than a default value. As to protect each circuit of the power converter 100, the primary-side control circuit 130 stops switching the current switch 120 at this moment.

Figure 5:
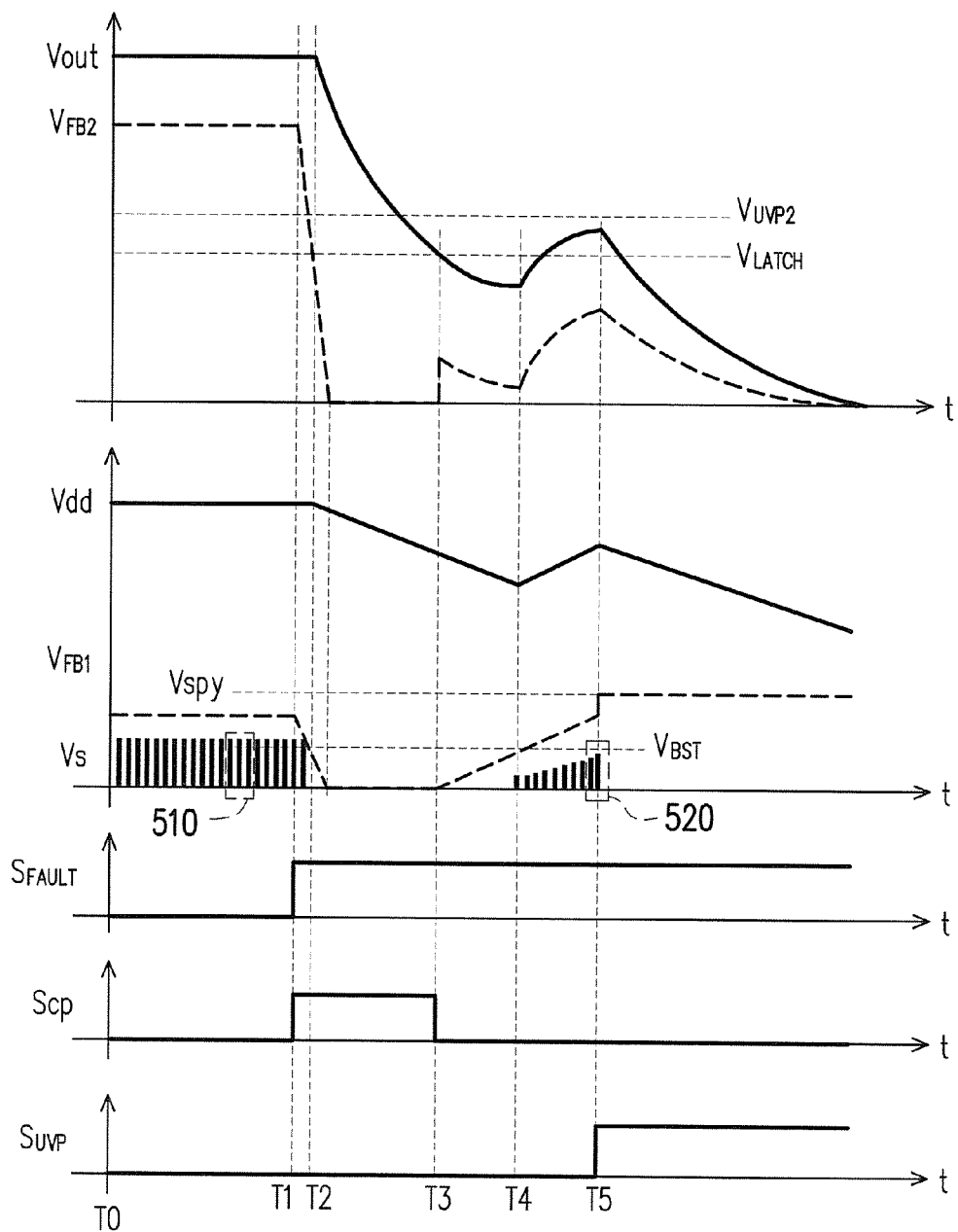
FIG. 5 is a signal timing chart of the output voltage, the feedback signal, the primary-side feedback signal, the operating voltage, the sensing signal, the fault signal, the transistor control signal, and the protecting signal in FIG. 3 or FIG. 4 according to an embodiment of the invention.

FIG. 5 is a signal timing chart of the output voltage Vout, the feedback signal $V_{FB2}$, the primary-side feedback signal $V_{FB1}$, the operating voltage Vdd of the primary-side control circuit 130, the sensing signal Vs, the fault signal $S_{FAULT}$, the transistor control signal $S_C$, and the protecting signal $S_{UVP}$ in FIG. 3 or FIG. 4 according to an embodiment of the invention. During the period from time T0 to time T1, the power converter 100 is powered on and operates normally. The feedback signal $V_{FB2}$ and the primary-side feedback signal $V_{FB1}$ are at normal status. The sensing signal Vs is presented as a pulse pattern because the output voltage Vout is changed along with the switching of the current switch 120 by the switching signal Sw. The transistor control signal Scp is at disable status (i.e., logic 1).

At time point T1, the fault signal $S_{FAULT}$ is enabled for the fault event occurs. The latch circuit 170 turns the transistor control signal Scp into the enable status (i.e., logic 0) from the disable status (i.e., logic 1), and maintains the enable status of the transistor control signal Scp. The feedback signal $V_{FB2}$ and the primary-side feedback signal $V_{FB1}$ are turned into clamped status (pulled to low) from their normal statuses with a steep slope because of the parasitic capacitances of the optical coupler 150.

At time point T2, since the primary-side feedback signal $V_{FB1}$ becomes smaller than a burst threshold level $V_{BST}$, the primary-side control circuit 130 will stop switching the current switch 120 of the primary winding Np. Because the switching of the current switch 120 is stopped, the output voltage Vout and the operating voltage Vdd will begin to gradually decrease.

At time point T3, when the output voltage Vout is lower than the default latch voltage value $V_{LATCH}$ of the latch circuit 170, the latch circuit 170 will release the feedback signal $V_{FB2}$ to let the feedback signal $V_{FB2}$ away from the clamped status. The primary-side feedback signal $V_{FB1}$ is gradually increased because of the feedback signal $V_{FB2}$ and transmission of the optical coupler 150. At time point T4, since the primary-side feedback signal $V_{H31}$ is larger than the burst threshold level $V_{BST}$, the primary-side control circuit 130 will resume switching the current switch of the primary winding Np. At time point T5, the sensing signal determination circuit 430 of the primary-side control circuit 130 determines the output voltage Vout is back to normal by determining whether the voltage level Vsx of the sensing signal Vs is larger than the protect voltage value $V_{UVP1}$ or not. The protect voltage value $V_{UVP2}$ in FIG. 5 is related to the protect voltage value $V_{UVP1}$ in FIGS. 4, 6, and 7. The ratio of the output voltage Vout and the voltage level Vsx of the sensing voltage Vs is equal to the ratio of the protect voltage value $V_{UVP2}$ and the protect voltage value $V_{UVP1}$. If the output voltage Vout is not larger than the protect voltage value $V_{UVP2}$, it is referred that the output voltage Vout is not back to normal. Such that, the primary-side control circuit 130 enables the protecting signal $S_{UVP}$ to stop providing the power of the power converter 100 at time point T5 in FIG. 5. On the contrary, if the output voltage Vout is larger than the protect voltage value $V_{UVP2}$, it is referred that the output voltage Vout is back to normal, and the protecting signal $S_{UVP}$ will be still disabled (not shown in FIG. 5).

It is described that how to determine that the output voltage Vout is back to normal or not according to the sensing signal Vs. FIG. 6 is a signal timing chart of the sensing signal Vs in block 510 of FIG. 5 and the corresponding protecting signal $S_{UVP}$. FIG. 7 is a signal timing chart of the sensing signal Vs in block 520 of FIG. 5 and the corresponding protecting signal $S_{UVP}$. Referring to FIG. 6, a voltage level Vs1 is correlated to the output voltage Vout. When a voltage level Vs1 of the sensing signal Vs is larger than the protect voltage value $V_{UVP1}$, it is referred that the output voltage Vout is normal. Now referring to FIG. 7, a voltage level Vs2 is also correlated to the output voltage Vout. When a voltage Vs2 of the sensing signal Vs is not larger than the protect voltage value $V_{UVP1}$ it is referred that the output voltage Vout is abnormal, and the power converter 100 needs to be shut down for protecting the circuits in the power converter 100.

As to the foregoing descriptions, the power converter and the control method therefor as described in embodiments of the invention can clamp the feedback signal and maintain the clamped status of the feedback signal by the latch circuit located in the secondary-side control circuit when a fault event occurs. And, when the output voltage of the power converter has been pulled low, the latch circuit can release the feedback signal to leave the clamped status. Such that, the feedback signal can be still controlled properly when a output voltage has been pulled down without disposing a charge pump circuit for increasing the operating voltage of the secondary-side control circuit.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A power converter, comprising:
a secondary-side control circuit configured for operating on a secondary side of a transformer wherein the transformer also has a primary side that is configured to receive an input voltage, the secondary-side control circuit also configured to operate with a primary-side control circuit that is configured for operating on the primary side and configured to be coupled to the primary side, the primary side control circuit configured to control a current switch that is configured to be coupled to a primary winding and switching thereof,
wherein the secondary-side control circuit comprises:
a latch circuit electrically connected to receive an output voltage and coupled to a fault event terminal, for maintaining a clamped status of a feedback signal when a fault event occurs and clamps the feedback signal to ground in response to receiving the fault event through the fault event terminal and receiving the output voltage as substantially normal,
wherein the primary-side control circuit stops switching the current switch of the primary winding when the feedback signal is clamped, and the latch circuit releases the feedback signal when the output voltage is lower than a default latch voltage value.

2. The power converter according to claim 1, wherein the secondary-side control circuit does not include a charge pump circuit.

3. The power converter according to claim 1, wherein when the feedback signal is released, the primary-side control circuit resumes switching the current switch of the primary winding.

4. The power converter according to claim 3, further including that the primary-side control circuit causes the output voltage to drop by stopping switching the current switch and switching the current switch normally in response to the output voltage going back to substantially normal.

5. The power converter according to claim 3, further comprising:

the secondary-side control circuit configured to operate with an optical coupler configured for transmitting the feedback signal from the secondary-side control circuit to the primary-side control circuit.

6. A method for a power converter comprising configuring a secondary-side control circuit for operating on a secondary side of a transformer wherein the transformer includes a primary side, and configuring the secondary-side control circuit to operate with a primary-side control circuit on the primary side of the transformer;

configuring the secondary-side control circuit to receive an external fault event signal and detect from the fault event signal whether a fault event occurs or not;

configuring the secondary-side control circuit to, when the fault event occurs and an output voltage of the secondary-side control circuit is substantially normal, clamp a feedback signal and maintain a clamped status of the feedback signal by a latch circuit of the secondary-side control circuit;

configuring the secondary-side control circuit to operate with the primary-side control circuit that stopping switching a current switch of a primary winding of the transformer when the feedback signal is clamped; and configuring the secondary-side control circuit to release the feedback signal by the latch circuit when the output voltage is lower than a default latch voltage value.

7. The method according to claim 6, wherein the secondary-side control circuit does not include a charge pump circuit.

8. The method according to claim 6, further comprising: configuring the secondary-side control circuit to operate with the primary-side control circuit configured for resuming switching the current switch of the primary winding when the feedback signal is released.

9. The method according to claim 8, further comprising:

configuring the secondary-side control circuit to operate with the primary-side control circuit that causes the output voltage to drop by stopping switching the current switch and switching the current switch normally in response to the output voltage going back to substantially normal.

10. The method according to claim 6, further comprising: configuring the secondary-side control circuit for transmitting the feedback signal from the secondary-side control circuit to the primary-side control circuit by an optical coupler.

* * * * *